Aug. 22, 1939.  E. D. WILKERSON  2,170,177
ANTIRATTLE SPRING SADDLE BRACE
Filed June 19, 1937
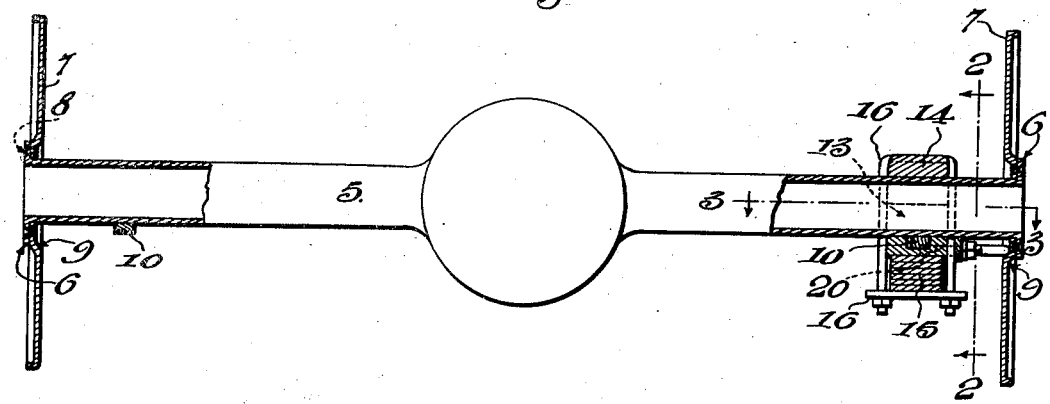
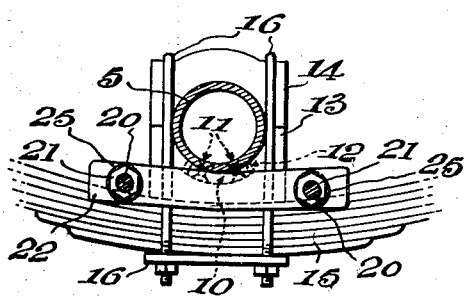
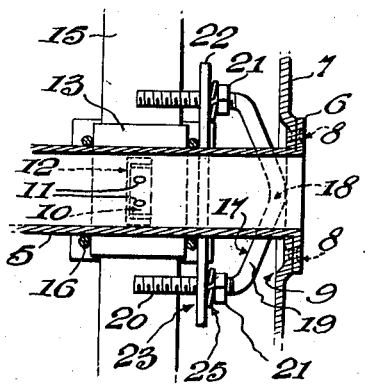
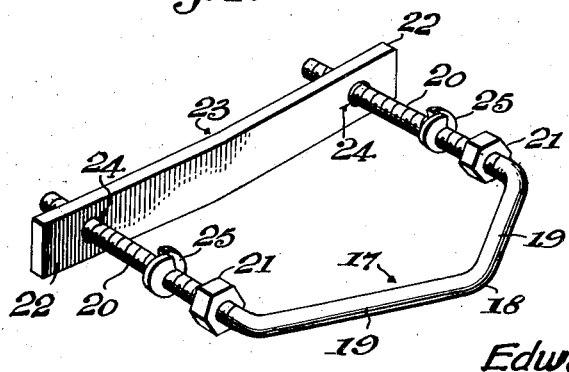
Inventor
Edward D. Wilkerson.
By Chas. J. Diller
Attorney Patented Aug. 22, 1939

2,170,177

UNITED STATES PATENT OFFICE 2,170,177

ANTIRATTLE SPRING SADDLE BRACE

Edward David Wilkerson, Orange, N. J.

Application June 19, 1937, Serial No. 149,251

9 Claims. (Cl. 267—52)

The invention relates generally to the spring suspension equipments of automotive running gear and primarily seeks to provide a novel form of brace for eliminating rattle in the spring saddles included in such equipments.

In spring suspension equipments, particularly those employed in motor vehicles of the torque tube drive type, there are included spring saddles to which the rear springs are secured and which embrace the rear axle housing and rock slightly thereon. So as to prevent lateral movement of the saddles along the axle housing, each saddle is provided with a grooveway to receive or closely straddle an arcuate retainer block secured upon said axle housing. After continued use these parts become worn and excessive lateral play develops between the saddles and blocks permitting them to violently engage, one with the other, and cause a very annoying rattling or chattering.

In its more detailed nature, the invention resides in the provision of a novel adjustable brace mountable between each saddle and a fixed abutment carried by the axle housing and serving to take up excessive lateral play between the saddle and its associated retainer block, thereby preventing rattling.

Another object of the invention is to provide a brace of the character stated in which is embodied means for automatically compensating for wear.

With the above and other objects in view that will hereinafter appear, the nature of the invention will be more fully understood by following the description, the appended claims, and the several views illustrated in the accompanying drawing.

In the drawing:—

Figure 1 is a somewhat diagrammatic rear elevation and part section of a rear axle housing and spring assembly upon which the invention is applied.

Figure 2 is a vertical cross section taken on the line 2—2 on Figure 1.

Figure 3 is a horizontal section taken on the line 3—3 on Figure 1.

Figure 4 is a detail perspective view of the invention per se.

In the drawing in which like numerals of reference indicate like parts in all of the figures, 5 designates a rear axle housing of the conventional torque tube drive type, and 6 the end flanges of the housing to which the brake assembly foundation or backing plates 7 are secured as at 8. The central portion of each plate is dished or offset as indicated in Figure 1, thus providing an annular shoulder 9 which I utilize in retaining the improved brace in place in a manner that will be described hereinafter.

An arcuate retainer block 10 is riveted or otherwise secured as at 11 to the underside of the housing adjacent each end thereof. These blocks are adapted to have a moving fit in grooveways 12 provided therefor in the lower half of the saddle blocks with which they are associated. The saddle blocks are composed of lower and upper half members 13 and 14 having mating recesses shaped to embrace the axle housing end portions, and these block halves are secured together and to the respective springs 15 by U-clip equipments 16.

All of the parts hereinbefore described are of conventional form. They do not, in themselves, form a part of the invention, but rather provide the need for the invention, or present the problem which the invention seeks to solve. During the flexing of the springs 15, the saddles 13, 14 rock slightly about the axle housing portions which they embrace, but they are held against free lateral movement by the blocks 10. After continued use the engaging surfaces of the saddles and blocks wear and excessive lateral play is permitted. With the parts in this condition the saddles and blocks engage violently during flexing of the springs and side swaying or turning of the vehicle and a very disturbing clatter results. It has been impossible heretofore to eliminate this noise without disassembly and reshaping or replacement of parts.

In the practical development of the invention I provide a generally U-shaped brace rod including a base portion 17 comprising a centrally disposed crest or bearing 18 and angularly disposed or diverging arm portions 19. At their ends the arm portions are bent to form parallel arms 20 and these are threaded to receive adjustment nuts 21. A presser bar 22, bent slightly as at 23 to fit beneath the respective axle housing end and apertured at its ends as at 24, is mountable upon the free ends of the arms 20, and spring lock washers 25 are interposed between the nuts and the respective ends of the bar.

When applying the improved brace to practical use the bearing portion 18 is disposed beneath the respective end of the axle housing and in the recess afforded by the central dishing of the plate 7 so that the shoulder 9 will prevent any downward slipping of said bearing portion. The free ends of the arms 20 are placed astride, or one at each side, of the adjacent saddle, and preferably upon the uppermost leaf of the spring 15 so that the spring will prevent any downward slipping of said arm ends. The nuts 21 are adjusted to force the presser bar against the outer face of the saddle, thus taking up the excessive clearance between the saddle and its associated retainer block 10 without preventing the desired slight rocking of the saddle about the axle housing.

By disposing the brace rod base arms 19 in angular or diverging relation the brace rod is made to comprise a yieldable or resilient whole capable of automatically adjusting itself to compensate for wear due to the constant rattle preventing lateral contact between the saddle and its associated retainer block. This wear compensating feature may be accentuated by interposing the spring lock washers 25 between the nuts 21 and the bar 22, said washers thus serving the dual function of lock washers and compression storing means. Other resilient compression storing inserts may be employed if desired.

In the foregoing description I have disclosed a very simple and novel form of anti-rattle brace which can be applied quickly and easily and without disassembly of any parts, and one which is capable of effectively eliminating noise occasioning clearances between spring saddles and their associated retainer blocks.

What I claim is:

1. In a vehicle running gear wherein is provided an axle housing, a spring saddle embracing the housing with a moving fit, a fixed abutment bearing a definite spaced relation to said saddle, and means engageable by the saddle to prevent lateral freedom of the saddle, a brace interposed between the abutment and the saddle, and means for extending the brace to force the saddle against said lateral freedom preventing means.

2. The combination of an axle housing carrying a fixed abutment, a spring saddle embracing the housing with a moving fit, means engageable by the saddle to prevent lateral freedom of the saddle, and an extensible brace interposed between the abutment and the saddle.

3. The combination of an axle housing carrying a fixed abutment, a spring saddle embracing the housing with a moving fit, means engageable by the saddle to prevent lateral freedom of the saddle, and a compression storing brace interposed between the abutment and the saddle.

4. The combination of an axle housing carrying a fixed abutment, a spring saddle embracing the housing with a moving fit, means engageable by the saddle to prevent lateral freedom of the saddle, and an extensible compression storing brace interposed between the abutment and the saddle.

5. The combination of an axle housing, a retainer block fixed on the housing, a spring saddle block embracing the housing with a moving fit and recessed to receive the retainer block to prevent free movement of the saddle along the housing, and compression storing means constantly urging the saddle longitudinally of the housing to take up play between the saddle and the retainer block.

6. The combination of an axle housing, a retainer block fixed on the housing, a spring saddle block embracing the housing with a moving fit and recessed to receive the retainer block to prevent free movement of the saddle along the housing, a spring secured to said saddle, a brake assembly foundation plate carried by the housing and having a seating recess therein, and an anti-rattle brace comprising a generally U-shaped body including a base portion seated in said plate recess and threaded arms resting on said spring and disposed one at each side of the saddle, a presser plate engaging the saddle and movable along said arms, and means for forcing said plate along said arms.

7. The combination of an axle housing, a retainer block fixed on the housing, a spring saddle block embracing the housing with a moving fit and recessed to receive the retainer block to prevent free movement of the saddle along the housing, a spring secured to said saddle, a brake assembly foundation plate carried by the housing and having a seating recess therein, and an anti-rattle brace comprising a generally U-shaped body including a base portion seated in said plate recess and threaded arms resting on said spring and disposed one at each side of the saddle, a presser plate engaging the saddle and movable along said arms, means for forcing said plate along said arms, and compression storing means interposed between said plate and said forcing means.

8. The combination of an axle housing, a retainer block fixed on the housing, a spring saddle block embracing the housing with a moving fit and recessed to receive the retainer block to prevent free movement of the saddle along the housing, a spring secured to said saddle, a brake assembly foundation plate carried by the housing and having a seating recess therein, and an anti-rattle brace comprising a generally U-shaped body including a base and threaded arms resting on said spring and disposed one at each side of the saddle, a presser plate engaging the saddle and movable along said arms, and nuts for forcing said presser plate along said arms, said base including diverging arm portions rendering said base yieldable for compression storing purposes and providing a central bearing portion for seating in said plate recess.

9. The combination of an axle housing, a retainer block fixed on the housing, a spring saddle block embracing the housing with a moving fit and recessed to receive the retainer block to prevent free movement of the saddle along the housing, a spring secured to said saddle, a brake assembly foundation plate carried by the housing and having a seating recess therein, and an anti-rattle brace comprising a generally U-shaped body including a base and threaded arms resting on said spring and disposed one at each side of the saddle, a presser plate engaging the saddle and movable along said arms, nuts for forcing said presser plate along said arms, said base including diverging arm portions rendering said base yieldable for compression storing purposes and providing a central bearing portion for seating in said plate recess, and spring lock washers interposed between said presser plate and said nuts.

EDWARD DAVID WILKERSON.